Dec. 8, 1970     W. M. AUBREY, JR., ET AL     3,545,957
METHOD OF INDURATING BALLED CONCENTRATES CONTAINING IRON ORE
Filed Sept. 6, 1967
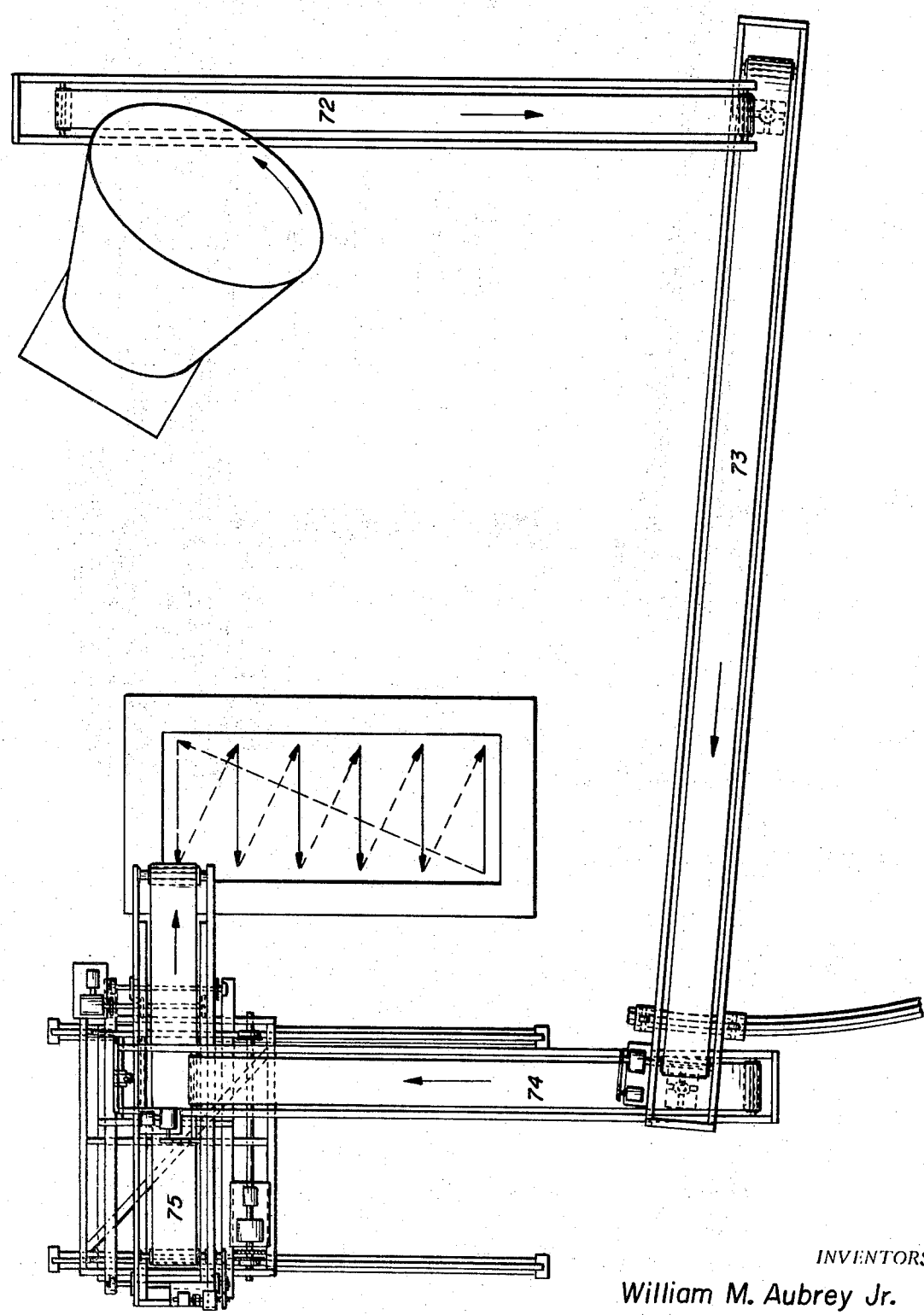
INVENTORS
*William M. Aubrey Jr.*
*Richard P. Ketter*
*Ezekiel C. Dominguez*

United States Patent Office 3,545,957
Patented Dec. 8, 1970

---

3,545,957
METHOD OF INDURATING BALLED CONCENTRATES CONTAINING IRON ORE
William M. Aubrey, Richard P. Ketter, and Ezekiel C. Dominguez, Bethlehem, Pa., assignors to Bethlehem Steel Corporation, a corporation of Delaware
Filed Sept. 6, 1967, Ser. No. 665,814
Int. Cl. C21b 1/00
U.S. Cl. 75—3                             6 Claims

ABSTRACT OF THE DISCLOSURE

A method of indurating green balls of iron ore concentrates in which a mixture of green balls and a solid carbonaceous fuel not incorporated in or rolled into the surface of the balls is fed to the vertical shaft furnace in a specific feed pattern and is heated to a temperature between 2200° F. and 2500° F. for a time sufficient to indurate the balls. The throughput of the furnace is increased over that obtained without the addition of solid fuel. The solid carbonaceous fuel may have a particle size of about 9/16 inch to 100 mesh Tyler Sieve size and may be added in amounts between 8 pounds and 30 pounds per ton of green balled concentrate.

BACKGROUND OF THE INVENTION

It is well known that green balls of magnetite concentrates can be indurated in a vertical shaft furnace which is fired by means of at least one external combustion chamber, to produce pellets which are sufficiently hard and possess the desired strength to withstand relatively rough handling during transportation and charging into metallurgical furnaces. Finely divided solid fuel, such as coal or coke breeze, is sometimes added to the magnetite concentrates prior to balling, to provide a portion of the heat required for indurating the green balls. The process works well for magnetite concentrates since the chemical reaction of converting magnetite to hematite during indurating is exothermic. However, indurating green balls of hematite concentrates or green balls of iron ore concentrates to which fluxing materials have been added (generally referred to as "self-fluxed" or "super fluxed" pellets) is not simple as the reactions are endothermic and a larger heat input is required to produce properly indurated pellets than when green balls of magnetite concentrates are fired. Adding a greater than normal amount of internal solid fuel to such concentrates prior to balling results in green balls having poor green strength and in indurated pellets having, after firing, an undesirable porous internal structure which is weak and causes failure of the pellets during handling. Adding the required additional fuel after balling by externally coating the green balls with fine solid fuel results in poor bed firing characteristics conducive to fusion of the balls and the formation of clinkers.

It is the primary object of this invention to provide a method for indurating green balls of magnetite iron ore concentrates in a vertical shaft furnace whereby the capacity of the furnace is increased without any physical change being made to the furnace or its mode of operation.

It is another object of this invention to provide a method for indurating green balls of hematite concentrates and green balls of iron ore concentrates containing fluxing materials in a vertical shaft furnace.

SUMMARY OF THE INVENTION

Broadly, the invention is directed to charging a mixture of green balls of iron ore concentrates which may contain fluxing materials, and a quantity of solid carbonaceous fuel, not incorporated in or rolled onto the surface of the green balls, to the upper stove of a vertical shaft furnace in a specific pattern hereinafter described. The green balls are fired at a temperature within the range of about 2200° F. to about 2500° F. for a time sufficient to indurate the green balls.

The drawing is a plan view showing the general layout of apparatus for conveying charge materials from a balling drum to the stockline in the upper stove of a vertical shaft furnace and the pattern in which these materials are charged onto the stockline of the furnace.

Any one of several solid carbonaceous fuels, for example, coke, coke breeze, petroleum coke, anthracite coal may be used. The particle size of the solid carbonaceous fuel may be as large as about 9/16 inch and as small as about 100 mesh Tyler Sieve Size, but a maximum particle size of about ½ inch is preferred. The solid carbonaceous fuel may be added in amounts between about 8 pounds and 30 pounds per tone of green balls of iron oer concentrates.

It is essential in the practice of this invention that the mixture of green balls and solid fuel be fed to the furnace in such a manner that the stockline, or upper surface of the mixture, is substantially flat, that is, free of pronounced ridges and valleys. A suitable apparatus for accomplishing this is shown in FIG. 5 of U.S. Pat. No. 3,137,398 to Steffensen.

The drawing accompanying the present application is a duplicate of FIG. 5 of said Pat. No. 3,137,398. Reference may be had to said patent, column 3, line 15 to column 4, line 65, to describe the apparatus and its mode of operation.

In carrying out this invention the solid fuel may be added to the green balls on any of the belts 72, 73, 74 or 75 but preferably on belt 72.

While it is impossible to indurate green balls containing 100% hematite concentrates it is preferred to indurate green balls containing a mixture of magnetite and hematite concentrates. Indurated pellets may be produced from a mix of about 30% to 50% hematite concentrates and about 50% to 70% magnetite concentrates. With such mixtures the amount of added solid carbonaceous fuel per ton of green balls should be between about 8 and 16 pounds.

It is possible to indurate green balls of magnetite concentrates which contain up to about 12% flux materials. With such a mixture the amount of added solid carbonaceous fuel per ton of green balls may be about 25 pounds to about 30 pounds. Suitable flux materials are magnesium carbonate and calcium carbonate or mixtures thereof.

This process is particularly adapted to be used in the vertical shaft furnace disclosed in U.S. Pat. No. 3,003,756 to Steffensen.

In a specific example of the process, green balls of 100% magnetite concentrate mixed with 11.0 pounds of coke breeze per ton of green balls were fed to the upper stove of a vertical shaft furnace in the multiple parallel pass transverse feed pattern above described. The coke breeze had a particle size of ½ inch x 100 mesh. In a period of 65 hours, 3580 tons of fired pellets were produced. When operated without added solid fuel this furnace usually produces 3250 tons of fired pellets from green balls of magnetite concentrates over the same period of time. There was, therefore, an increase of about 10% in production of indurated pellets.

In another specific example, green balls consisting of 30% hematite concentrates and 70% magnetite concentrates together with 8.5 pounds of coke breeze per ton of green balls and having particle sizes ½" x 100 mesh Tyler Sieve Size were fed at the rate of 50 tons per hour to a vertical shaft furnace in the above described feed pattern, and indurated. All pellets thus manufactured were satisfactory. In comparison the production rate was not greater than 45 tons per hour when green balls made from a mix of 20% hematite and 80% magnetite were indurated without additions of solid fuel.

In another specific example of the invention a mixture of green balls and coke breeze was charged to the upper stove of a vertical shaft furnace in the aforesaid feed pattern. The green balls were formed from a mix of 100% magnetite to which 102.2 pounds of dry limestone per ton of magnetite were added. The limestone contained 96.6% $CaCO_3$, 1.60% $MgCO_3$, 0.9% $SiO_2$ and 0.35% $Al_2O_3$. The coke breeze which had a particle size of about ½″ x 100 mesh Tyler Sieve size was added in the amount of 11.7 pounds per ton of green balls. The furnace was operated for 8 hours with this feed material and produced 408 tons of fired pellets. When operated on green balls of 100% magnetite without added coal this furnace normally produces about 50 tons of fired pellets per hour.

We claim:

1. In a method of producing indurated pellets from green balls of iron ore concentrates in a vertical shaft furnace, the improvement comprising:
   (a) charging into the top of the furnace a mixture of green balls and a solid carbonaceous fuel,
      (i) the green balls being formed from at least one iron ore concentrate taken from the group consisting of magnetite and hematite,
      (ii) the solid carbonaceous fuel being taken from the group consisting of coke, coke breeze, petroleum coke and anthracite coal, having a particle size of 9/16 inch to 100 mesh Tyler Sieve size, and being added in an amount between 8 and 30 pounds per ton of balled concentrate,
   (b) maintaining the upper surface of the charge substantially flat, and
   (c) firing the balls at a temperature and for a time sufficient to indurate the balls.

2. The method of claim 1 in which the iron ore concentrate is magnetite.

3. The method of claim 1 in which the iron ore concentrate is about 30% to 50% hematite and 50% to 70% magnetite and the amount of solid carbonaceous fuel added is from 8 pounds to about 16 pounds per ton of green balls of iron ore concentrates.

4. The method of claim 1 in which the iron ore concentrate is magnetite to which is added not more than 12% of at least one flux material taken from the group consisting of calcium carbonate and magnesium carbonate.

5. The method of claim 1 in which the solid carbonaceous fuel added is coke breeze.

6. The method of claim 1 in which the mixture is charged in a multiple pass parallel transverse feed pattern.

References Cited

UNITED STATES PATENTS

| | | | |
|---|---|---|---|
| 1,222,893 | 4/1917 | Schumacher | 75—5 |
| 2,696,432 | 12/1954 | Davis | 75—5 |
| 2,805,141 | 9/1957 | Apuli | 75—3 |
| 2,960,396 | 11/1960 | De Vaney | 75—3 |
| 3,003,756 | 10/1961 | Steffensen | 263—29 |
| 3,024,101 | 3/1962 | Erck et al. | 75—5 |
| 3,137,398 | 5/1964 | Steffensen | 214—18 |
| 3,219,436 | 11/1965 | Heitmann et al. | 75—3 X |
| 3,365,339 | 1/1968 | Beggs et al. | 75—3 |

OTHER REFERENCES

De Vaney, F. W.: Journal of Metals, February 1958, pp. 125–128.

ALLEN B. CURTIS, Primary Examiner